Patented Sept. 12, 1944

2,358,167

UNITED STATES PATENT OFFICE 2,358,167

TITANIUM OXIDE PIGMENT PRODUCTION

John L. Keats and James E. Booge, Wilmington, Del., assignors to E. I. du Pont de Nemours & Company, Wilmington, Del., a corporation of Delaware No Drawing. Application December 17, 1940, Serial No. 370,483

10 Claims. (Cl. 23—202)

This invention relates to the preparation of pigment-useful compounds, and more particularly to the preparation of titanium oxide pigments of desired, predetermined crystalline structure.

More specifically, the invention relates to novel methods for preparing improved titanium oxide pigments in the rutile crystalline modification, by conversion of anatase in the presence of a titanium oxide seeding or catalyzing agent adapted to promote or accelerate such conversion.

Titanium oxide, as X-ray diffraction pattern tests reveal, occurs in three crystalline modifications, i. e., anatase, brookite and rutile, the indices of refraction of which are, respectively, 2.52, 2.65 and 2.71. Rutile and anatase comprise the most adaptable forms for pigment purposes. Rutile may be precipitated upon hydrolysis of titanium chloride solutions while anatase results from the hydrolysis of titanium sulfate solutions. After the usual purification and washing treatments, calcination of a given hydrolysate, at temperatures in excess of substantially 750° C., and usually from about 850–1050° C., provides the final fully-developed pigment product.

Most present day commercial titanium oxide pigments are characteristically in the anatase crystalline modification which, as indicated, has the lower index of refraction. The sulfuric acid attack of titaniferous ores, such as ilmenite, and the hydrolysis of the resulting sulfate solution entails a process which is more economical and adaptable to commercial exploitation. Titanium chloride processes, on the other hand, present more difficult and costly operations, due more especially to the corrosion and related problems which are encountered therein. As a consequence, chloride processes are considered less economical and attractive for commercial exploitation.

As already noted, rutile possesses the highest refractive index and therefore the greatest potential hiding power as a pigment. In pigment manufacture it has already been proposed to convert anatase to rutile. However, such proposals contemplate heat treating anatase at relatively high calcination temperatures. Because of the intensity of the temperature which is required and the prevailing conditions necessarily present in effecting such desired conversion, unavoidable sintering of the product under treatment occurs which is very deleterious because it seriously and adversely impairs the pigment properties of the final product, especially its particle size, texture and tinting strength, to render the same wholly unfit for many desired and intended pigment uses.

We have found that these and other disadvantages inherent in prior processes for effecting the conversion of titanium oxide from one crystalline form to another can be readily and effectively overcome. It is among the objects of our invention, therefore, to provide a novel method and effective means for accomplishing these results. A particular object is to provide a highly useful and economical method for effecting the conversion of anatase to pigment rutile and without any attendant impairment in pigment properties which has characterized the final product from prior processes. A specific object is to provide a process in which sintering of the titanium oxide will be avoided, during conversion and in which no distortions within the crystal itself will arise. A specific object is to provide a novel method for effecting such conversions and for producing an improved type of fully developed pigment by treating hydrolysates, especially raw pigment anatase, at relatively low temperatures well below those of a calcination order and considered necessary heretofore as essential in the development of such essential pigment properties as tinting strength, texture, color, opacity, hiding power, oil absorption, etc.

These and other objects are attainable in this invention, which broadly comprises subjecting raw pigment titanium oxide possessing a given crystalline pattern to treatment in an aqueous acidic medium and at an elevated temperature in the presence of raw and/or pigment-developed titanium oxide in another crystalline modification and until conversion to said latter modification becomes effected.

In a more specific and preferred embodiment, the invention comprises producing pigment quality rutile titanium oxide by subjecting relatively pure, precipitated raw anatase titanium oxide, while in an aqueous acidic medium, to heat treatment at a temperature of at least 150° C. in the presence of a relatively minor quantity of a rutile conversion promoter comprising precipitated, raw rutile titanium oxide.

In one practical adaptation, a titanium oxide hydrolysate in one crystalline pattern, as for instance anatase, and a suitable but minor quantity of a titanium oxide hydrolysate of another crystalline modification, such as rutile, is mixed with an aqueous monobasic acid solution and the resulting suspension is then subjected to treatment, within a closed container, at an elevated temperature of at least 150° C., and under a superatmospheric pressure corresponding to the temperature employed. This treatment is continued for a sufficient period of time until the first-mentioned hydrolysate (anatase) becomes substantially completely converted to the crystalline modification of the second hydrolysate (rutile). Thus, in a specific and preferred adaptation involving the substantially complete conversion of anatase to rutile, a mixture containing, say, from about 60-80% of an anatase hydrolysate consisting of the purified TiO₂ precipitate obtained from the hydrolysis of a titanium sulfate solution in accordance with, for example, the methods contemplated in U. S. Reissue Patents 18,854 or 18,790, and from about 40-20% of a raw rutile titanium oxide precipitate obtained from the hydrolysis of a titanium chloride solution, in accordance with, for example, the procedures of U. S. Patent 2,062,133, are caused to be suitably slurried in aqueous hydrochloric acid. Preferably, an amount of acid is employed which is sufficient to peptize the TiO₂ constituents in the mixture and provide an acid concentration of about substantially 50 g./l. The combination or mixture which is thus obtained is thereupon heated within a closed reaction vessel, such as an autoclave or bomb type of container, for a period of about 1 hour, with or without agitation, to temperatures ranging, preferably, from substantially 200 to 350° C., and under the pressure generated by the solution under treatment at the prevailing temperature of heating, whereby the reactants are caused to be maintained in aqueous slurry condition throughout treatment. After conversion has been completed (which, as stated, occurs in about 1 hour—and usually does not exceed substantially 3 hours' time) the treated product is removed from the reaction vessel and is then suitably filtered and purified by repeated washing. The recovered product, after drying, consists of a novel, highly useful rutile pigment possessing fully-developed pigment properties, especially such essential characteristics as requisite tinting strength, hiding power and color, which permit of its direct use as a pigment without recourse to high temperature calcination treatment heretofore required in developing such essential pigment characteristics.

To a more complete understanding of the invention, the following examples are given, each being merely in illustration but not in limitation of the invention:

*Example I*

A mixture consisting of the following:

| | Grams |
|---|---|
| TiO₂ as raw rutile (50% of total TiO₂) | 30 |
| TiO₂ (50% of total TiO₂) as desulfated anatase raw pigment from the hydrolysis of a phosphate-containing titanium sulfate solution (the P₂O₅ content of said anatase, on the pigment basis, being 0.28%) | 30 |
| HCl | 30 | was diluted with water until the TiO₂ concentration was 200 grams per liter. This slurry was placed inside a one-liter capacity vessel fitted with a stopper having a spiral capillary opening and this vessel was then placed inside a steel autoclave which was gas fired externally. A small amount of water was placed inside the steel autoclave. The charge was heated to 250° C. and held at that temperature for one hour. The pressure was that generated by the solution at the specified temperature and was about 750 lbs. per sq. in. or 50 atmospheres. The product after removal from the autoclave was filtered and washed free of chloride ions. The product was then heated to 500° C. to develop crystallinity so that the lines in the X-ray pattern would be sharper. (Heating at this temperature, in dry form, causes no conversion from one crystal form to another.) The pattern showed the lines only of rutile, indicating that the anatase in the original mixture had been completely converted to rutile.

*Example II*

A mixture consisting of 2 parts raw rutile (20% of total TiO₂) and 8 parts desulfated anatase raw pigment (80% total TiO₂) was slurried in 10.3 parts concentrated HCl and the slurry diluted to a concentration of 200 grams TiO₂ and 100 grams HCl per liter. The anatase raw pigment was comparatively phosphate-free having been precipitated from a titanium sulfate solution, which had been prepared from phosphorous-free materials. The mixture of raw pigments was sealed in a tube-like vessel and the tube placed inside of a steel bomb tube. The charge was heated to 250° C. and held at this temperature for one hour with constant agitation. The pigment product after removal from the autoclave was 95% in the rutile crystal form as determined by X-ray analysis.

In applying the invention to a cyclic process wherein part of the autoclaved product is returned and mixed with the anatase raw pigment being fed to the autoclave and the rutile obtained by autoclaving the original mixture is employed as a seeding agent to effect conversion of additional quantities of anatase, the following illustrative example is given:

*Example III*

A mixture consisting of 2.75 parts TiO₂ as raw rutile (45% of total TiO₂) prepared from TiCl₄ and 3.4 parts TiO₂ as desulfated anatase and 8.8 parts HCl was autoclaved at 250° C. for one hour. The final product was all rutile. Part of this rutile product, equivalent to 4.9 parts TiO₂, was mixed with an equal amount of desulfated anatase and the new mixture autoclaved at 250° C. for one hour while suspended in dilute HCl. The product obtained by autoclaving the second mixture was at least 75% rutile indicating that the product from the first autoclave operation was partially effective in promoting conversion of additional quantities of anatase to rutile in the second autoclave step.

While the invention has been illustrated as applied to certain specific and preferred embodiments, it will be obvious that it is not to be considered as limited thereto and that variance therefrom may be suitably had without departing from its underlying principles and scope. Thus, although preferred temperatures ranging from 200-350° C. have been indicated and found most desirably useful and effective in promoting desired conversions, temperatures of a somewhat higher order and up to, say, the critical temperature of water (364° C.), accompanied by correlated pressures, can also be used. As already noted, an essential requirement of the invention is that the treatment contemplated be conducted at a temperature and pressure at which the reaction medium remains in substantially liquid condition. As already stated, pressures corresponding to the temperature of the aqueous mixture under treatment are preferably employed in the invention, although in general employment is contemplated of pressures ranging from about 40-50 atmospheres at 200° C. (depending on the composition of the medium under treatment) and up to about 200-250 atmospheres when the aqueous medium is heated to near its critical temperature. While these orders of pressures are indicated as employable, higher pressures than those indicated may be used, if desired.

Similarly, though aqueous hydrochloric acid at a concentration of above substantially 5 g./l. and to as high as 500 g./l., but preferably from about 50-100 g./l., comprises a preferred type of medium for use in the invention, equivalent amounts of other aqueous acidic media, particularly other types of monobasic, inorganic, as well as organic acids, and especially the halogen-containing variety, or mixtures thereof, can be used in our invention in lieu of said hydrochloric acid and during the autoclaving treatment for converting the anatase to rutile. Among examples of other useful types may be mentioned such acids as nitric, formic, acetic, hydrobromic, hydriodic, perchloric, perbromic or di-, tri-, or chloracetic, etc.

Ordinary titanium sulfate solutions (from which anatase $TiO_2$ precipitates on hydrolysis) contain about 2 parts $H_2SO_4$ per part $TiO_2$. The presence of relatively small amounts of $H_2SO_4$ and of still smaller amounts of $H_3PO_4$ tend to inhibit conversion of anatase to rutile. Accordingly, when substantially complete conversion of anatase to rutile is desired, we have found it essential to our invention that the anatase hydrolysate shall be in substantially pure condition or completely desulfated, and that its $H_2SO_4$ content shall preferably be no greater than about 1.0 part/100 parts $TiO_2$, and also that the $H_3PO_4$ content of such hydrolysate shall be no more than about 0.5 part/100 parts $TiO_2$. Furthermore, where the anatase to be converted contains about 0.25% or more $P_2O_5$ on the $TiO_2$ basis, we have found it desirable, in instances where substantially complete conversion to rutile is desired, that the proportion of raw rutile in the original mixture shall be in excess of 20% and should range to as high as, say, about 40%, depending upon the amount of phosphate present. When a phosphate-free anatase is employed, the proportions of raw rutile may range to as low as about 20% in effecting such substantially complete conversions to rutile.

As will be evident, our invention affords a novel process for converting one crystal form of $TiO_2$, especially anatase, to another (rutile) by autoclaving a mixture of the two forms. An outstanding feature of the invention is that such conversion is conveniently accomplished, without resort to any calcination treatment. As already indicated, prior conversions, due to the fact that excessive and high temperatures of calcination have been required, that is, above 1000° C., are often accompanied by impairment of the pigment properties possessed by the final product, due to the objectionable sintering or distortions which take place within the crystal. As a result, a rutile product is obtained which is undesirably poor in tinting strength, hiding power and color characteristics, rendering it more or less defective for use as a pigment. In the instant invention, we provide means for converting the anatase to rutile in an aqueous phase and at temperatures as low as substantially 200° C., i. e., below about 100° C. above the boiling point of the solution. While the product obtained in accordance with our invention is adapted for direct use as a pigment, it can, if desired, be subjected to calcination treatment for any given purpose. However, since desired crystal conversion has already been effected, it is obvious that in no instance is it necessary to employ temperatures of a conversion order or in excess of substantially 500° C.

As will be evident further, our invention affords the direct production, without calcination, of a fully-developed titanium oxide pigment product converted to a desired state of crystallinity. Avoidance of calcination constitutes a very advantageous feature, not only because of the economical savings in fuel and plant equipment, but because of the avoidance of objectionable sintering of the pigment particles which inherently occurs during such calcination. As already stated, the calcination temperatures which are required, especially to effect conversion of $TiO_2$ from one crystalline pattern to another, are relatively high and the ensuing sintering adversely affects the uniformity and particle size, as well as texture, tinting strength, and hiding power of the final product. When the calcined product is relatively coarse and gritty in nature, it must, prior to use, be subjected to prolonged grinding treatment in an attempt to reduce to some degree the sintered aggregates. By the present invention, this disadvantage becomes eliminated and direct production is afforded of a pigment product which inherently is soft and smooth in texture, possesses excellent tinting strength, hiding power and color characteristics, and is completely free from sintered aggregates or coarse pigment particles.

We claim as our invention:

1. A process for obtaining rutile titanium dioxide by converting anatase titanium dioxide which comprises subjecting a mixture of an anatest hydrolysate and rutile while in an aqueous medium containing from above 5 g./l. to 500 g./l. of a monobasic acid to heat treatment at an elevated temperature and pressure, continuing said heating until said anatase is substantially completely converted to rutile, recovering the resulting $TiO_2$ product from said aqueous medium, and then subjecting the same to heat treatment at a temperature not exceeding 500° C.

2. A process for obtaining a rutile titanium dioxide pigment through conversion of anatase titanium dioxide which comprises subjecting an anatase hydrolysate while admixed with a minor amount of a rutile hydrolysate and while said mixture is in an aqueous medium containing from above 5 g./l. to about 500 g./l. of a monobasic acid, to heat treatment at a temperature above 150° C. under a superatmospheric pressure, continuing said treatment until said anatase is substantially completely converted to rutile, recovering the resulting $TiO_2$ product and then subjecting it to heat treatment at a temperature not exceeding 500° C.

3. A process for obtaining rutile $TiO_2$ by converting anatase $TiO_2$ which comprises subjecting an anatase hydrolysate admixed with from about 20-40% of a rutile hydrolysate and while the mixture is in an aqueous medium containing from above 5 to 500 g./l. concentration of a monobasic acid, to heat treatment at a temperature above 150° C. under a superatmospheric pressure, continuing said treatment until said anatase is substantially completely converted to rutile, recovering the resulting $TiO_2$ product, and then drying the same at a temperature not exceeding 500° C.

4. A process for obtaining a rutile $TiO_2$ pigment by converting anatase $TiO_2$ which comprises subjecting an anatase hydrolysate admixed with a minor quantity of a rutile hydrolysate while in an aqueous medium containing from above 5 to about 500 g./l. concentration of a monobasic acid to heat treatment at a temperature ranging from about 200 to about 350° C. and under a superatmospheric pressure corresponding to the temperature employed, continuing said treatment until substantially complete conversion of said anatase to rutile is effected, recovering the resulting TiO₂ product, and then drying the same at a temperature not exceeding 500° C.

5. A process for obtaining a rutile TiO₂ pigment by converting anatase TiO₂ which comprises subjecting an anatase hydrolysate admixed with from about 20–40% of a rutile hydrolysate while in an aqueous medium containing from about 50 to 100 g./l. concentration of a monobasic acid to heat treatment at a temperature ranging from about 200 to about 350° C. and under a superatmospheric pressure corresponding to the temperature employed, continuing said treatment until substantially complete conversion of said anatase to rutile is effected, recovering the resulting TiO₂ product, and then drying the same at a temperature not exceeding 500° C.

6. A process for obtaining a rutile TiO₂ pigment by converting anatase TiO₂ which comprises subjecting an anatase hydrolysate admixed with from about 20–40% of a rutile hydrolysate while in an aqueous medium containing from about 50–100 g./l. of hydrochloric acid to heat treatment at a temperature ranging from about 200 to about 350° C. and under a superatmospheric pressure corresponding to the temperature employed, continuing said treatment until substantially complete conversion of said anatase to rutile is effected, recovering the resulting TiO₂ product, and then drying the same at a temperature not exceeding 500° C.

7. A process for obtaining a rutile TiO₂ pigment by converting anatase TiO₂ which comprises subjecting a mixture consisting of a purified anatase hydrolysate recovered from a titanium sulfate solution and from about 20–40% of a purified rutile hydrolysate recovered from a titanium chloride solution to heat treatment at an elevated temperature and superatmospheric pressure while in an aqueous medium containing from about 50–100 g./l. of a monobasic acid, continuing said treatment until said anatase is substantially completely converted to rutile, recovering the resulting TiO₂ product, and then drying it at a temperature not exceeding 500° C.

8. A process for obtaining a rutile TiO₂ pigment by converting anatase TiO₂ which comprises subjecting a peptied mixture consisting of a purified anatase hydrolysate recovered from a titanium sulfate solution and from about 20–40% of a purified rutile hydrolysate recovered from a titanium chloride solution to heat treatment at a temperature ranging from about 200°–350° C. and a superatmospheric pressure while in an aqueous medium containing from about 50–100 g./l. of hydrochloric acid, continuing said treatment until said anatase is substantially completely converted to rutile, recovering the resulting TiO₂ product, and then drying it at a temperature not exceeding 500° C.

9. A process for obtaining a rutile titanium oxide pigment by converting anatase TiO₂ which comprises subjecting a mixture consisting of a purified anatase precipitate from the hydrolysis of a titanium sulfate solution and at least 20% of a purified rutile hydrolysate to treatment for about 1 hour at temperatures ranging from about 200–350° C. and under a superatmospheric pressure, while in an aqueous medium containing from above 5 g./l. to about 500 g./l. of a monobasic acid, recovering the resulting TiO₂ product, and then drying it at a temperature not exceeding 500° C.

10. A process for obtaining a rutile TiO₂ pigment by converting anatase which comprises subjecting a peptized TiO₂ mixture consisting of a purified anatase hydrolysate and from about 20–40% of a purified rutile hydrolysate, to treatment for a period of about 1 hour at a temperature ranging from about 200 to about 350° C. and under a superatmospheric pressure, while in an aqueous medium containing from about 50–100 g./l. of hydrochloric acid, recovering and purifying the resulting rutile product, and then drying the same at a temperature not exceeding 500° C.

JOHN L. KEATS.
JAMES E. BOOGE.